United States Patent [19]
Spengler et al.

[11] Patent Number: 5,426,003
[45] Date of Patent: Jun. 20, 1995

[54] METHOD OF FORMING A PLASMA SPRAYED INTERCONNECTION LAYER ON AN ELECTRODE OF AN ELECTROCHEMICAL CELL

[75] Inventors: Charles J. Spengler, Murrysville; George R. Folser, Lower Burrell; Shailesh D. Vora; Lewis Kuo, both of Monroeville, all of Pa.; Von L. Richards, Anyola, Ind.

[73] Assignee: Westinghouse Electric Corporation, Pittsburgh, Pa.

[21] Appl. No.: 195,774

[22] Filed: Feb. 14, 1994

[51] Int. Cl.⁶ .......................... H01M 8/12; B05D 5/12
[52] U.S. Cl. .......................................... 429/27; 429/31; 429/33; 29/623.5; 427/115; 427/446
[58] Field of Search ..................... 429/27, 30–33; 29/623.5; 427/446, 115, 453

[56] References Cited

U.S. PATENT DOCUMENTS

| | | | |
|---|---|---|---|
| 3,330,697 | 8/1963 | Pechini | 117/215 |
| 3,630,968 | 12/1971 | Hamano et al. | 252/521 |
| 3,823,302 | 7/1974 | Muehlberger | 219/121 P |
| 3,839,618 | 10/1974 | Muehlberger | 219/121 P |
| 4,049,841 | 9/1977 | Coker et al. | 427/34 |
| 4,128,776 | 12/1978 | Boquist et al. | 310/11 |
| 4,180,484 | 12/1979 | Marchant | 252/521 |
| 4,430,588 | 2/1984 | Way et al. | 310/11 |
| 4,490,444 | 12/1984 | Isenberg | 429/31 |
| 4,504,522 | 3/1985 | Kaiser et al. | 427/103 |
| 4,557,943 | 12/1985 | Rosler et al. | 427/38 |
| 4,597,170 | 1/1986 | Isenberg | 29/623.5 |
| 4,598,467 | 7/1986 | Isenberg et al. | 29/623.5 |
| 4,608,232 | 8/1986 | Sunano et al. | 422/88 |
| 4,609,562 | 9/1986 | Isenberg et al. | 427/8 |
| 4,629,537 | 12/1986 | Hsu | 204/15 |
| 4,686,158 | 8/1987 | Nishi et al. | 429/26 |
| 4,697,165 | 9/1987 | Ishiquro et al. | 338/34 |
| 4,857,420 | 8/1989 | Maricle et al. | 429/30 |
| 4,861,345 | 8/1989 | Bowker et al. | 29/623.1 |
| 4,880,670 | 11/1989 | Erbil | 427/226 |
| 4,895,576 | 1/1990 | Pal et al. | 29/623.5 |
| 4,927,670 | 5/1990 | Erbil | 427/255.3 |
| 4,965,090 | 10/1990 | Gartner et al. | 427/39 |
| 4,988,539 | 1/1991 | Breuil et al. | 427/126.3 |
| 5,021,259 | 6/1991 | Singelyn | 427/115 |
| 5,039,840 | 8/1991 | Boardman | 219/270 |
| 5,051,321 | 9/1991 | Kitagawa et al. | 429/30 |
| 5,080,689 | 1/1992 | Pal et al. | 29/623.5 |
| 5,085,742 | 2/1992 | Dollard et al. | 205/188 |
| 5,132,352 | 7/1992 | Richards et al. | 524/403 |

FOREIGN PATENT DOCUMENTS

497542A1 1/1992 European Pat. Off.

*Primary Examiner*—Anthony Skapars
*Attorney, Agent, or Firm*—Daniel P. Cillo

[57] ABSTRACT

A dense, substantially gas-tight, electrically conductive interconnection layer is formed on an air electrode structure of an electrochemical cell by (A) providing an electrode surface; (B) forming on a selected portion of the electrode surface, a layer of doped $LaCrO_3$ particles doped with an element selected from Ca, Sr, Ba, Mg, Co, Ni, Al and mixtures thereof by plasma spraying doped $LaCrO_3$ powder, preferably compensated with chromium as $Cr_2O_3$ and/or dopant element, preferably by plasma arc spraying; and, (C) heating the doped and compensated $LaCrO_3$ layer to about 1100° C. to 1300° C. to provide a dense, substantially gas-tight, substantially hydration-free, electrically conductive interconnection material bonded to the electrode surface. A solid electrolyte layer can be applied to the unselected portion of the air electrode, and a fuel electrode can be applied to the solid electrolyte, to provide an electrochemical cell.

17 Claims, 5 Drawing Sheets

METHOD OF FORMING A PLASMA SPRAYED INTERCONNECTION LAYER ON AN ELECTRODE OF AN ELECTROCHEMICAL CELL

GOVERNMENT CONTRACT

The Government of the United States of America has rights in this invention pursuant to Contract No. DE-FC21-91MC28055 awarded by the United States Department of Energy.

BACKGROUND OF THE INVENTION

1. Field of the Invention

The present invention relates generally to the field of electrochemical cells, and more particularly to the method of forming an electrically conductive interconnection layer on an electrode of a high temperature, solid oxide electrolyte, electrochemical cell by plasma spraying a compensated plasma spray feed powder to account for differential volatilization during plasma spraying. Even more particularly, the invention relates to a plasma or thermal sprayed dense, substantially leak proof, substantially hydration-free, electrically conductive doped lanthanum chromite interconnection layer bonded to an electrode of a high temperature, solid oxide electrolyte, electrochemical cell to serve as an electrical connection to an electrode of a second electrochemical cell.

High temperature, solid oxide electrolyte, electrochemical generator devices are taught in U.S. Pat. Nos. 4,345,468 (Isenberg) and 4,490,444 (Isenberg). These types of electrochemical generator devices are made up of a plurality of elongated, typically annular, electrochemical cells or fuel cells, which operationally convert chemical energy into direct-current electrical energy. The fuel cells are interconnected in series to provide a desired voltage and in parallel to provide a desired system current.

Each fuel cell typically includes an, optional, porous support tube, typically made of calcia stabilized zirconia which has a porous, annular, air electrode or cathode deposited generally surrounding the support tube. The air electrode is typically made of doped oxides of the perovskite family, such as $LaMnO_3$. Substantially surrounding the major portion of the air electrode is a dense layer of gas-tight solid electrolyte, typically made of yttria stabilized zirconia. Substantially surrounding the solid electrolyte is a porous, fuel electrode or anode, typically made of nickel-zirconia cermet or cobalt-zirconia cermet. Both the solid electrolyte and the outer electrode, or, in this instance, the fuel electrode, are discontinuous at a selected radial segment to allow for the inclusion of an electrically conductive, gas-tight, dense interconnection material which serves as an electronic interconnection between adjacent fuel cells. A selected radial segment of the air electrode is, accordingly, covered by the interconnection material. The interconnection material is typically made of doped lanthanum chromite film. The dopant typically used is Mg, although other suggested dopants are Ca and Sr. The dopant substituted on the $La^{3+}$ and/or $Cr^{3+}$ sites serves, inter alia., to enhance the conductivity of the lanthanum chromite p-type conductor.

Various methods have been used to apply the interconnection material on top of the air electrode. U.S. Pat. Nos. 4,597,170 (Isenberg) and 4,609,562 (Isenberg, et al.) teach the conventional application of an interconnection material on the surface of a selected portion of an air electrode using a modified electrochemical vapor deposition process, at temperatures of about 1300° C. to 1450° C., in a reducing atmosphere, with the suggested use of vaporized halides of lanthanum, chromium, magnesium, calcium or strontium for the deposition of the interconnection material onto the air electrode.

It has been found, however, that there are certain thermodynamic and kinetic limitations in doping the interconnection material from a vapor phase by a vapor deposition process at temperatures between about 1300° C. to 1450° C. The vapor pressures of, for example, the calcium chloride and strontium chloride are low at vapor deposition temperatures, and therefore, the transport of these dopants to the reaction zone at the surface of the air electrode is difficult. Thus, magnesium has conventionally been used as the primary dopant for the lanthanum chromite interconnection material. However, a magnesium doped lanthanum chromite interconnection has a substantial thermal expansion mismatch with the air electrode and electrolyte materials which can cause destabilization effects and reduce electrochemical generator output. Additionally, the use of halide vapors at 1300° C. to 1450° C. in a reducing atmosphere can interact with the air electrode material during the initial period of interconnection deposition. This can cause air electrode leaching of its constituents, such as Mn, into the interconnection which also can cause destabilization effects and problems in the electrochemical generator output. Also the long term stability of interconnection layers made by electrochemical vapor deposition techniques remains questionable even though such techniques initially form substantially leak tight interconnections.

U.S. Pat. No. 4,598,467 (Ruka), in an attempt to solve the interconnection thermal expansion mismatch problems, taught cobalt doped lanthanum chromite, preferably also doped with magnesium, for example, $LaCr_{0.93}Mg_{0.03}Co_{0.04}O_3$, also by a modified electrochemical vaporization method using chloride vapors of lanthanum, chromium, magnesium and cobalt. However, cobalt chloride vapors similarly have low pressures at vapor deposition temperatures, and accordingly, suffer from similar thermodynamic and kinetic limitations which results in an inadequately doped interconnection.

Other methods of making doped lanthanum chromite interconnection materials have been tried. U.S. Pat. No. 4,861,345 (Bowker, et al.), in a different approach for forming the interconnection layer on an air electrode of a electrochemical cell, taught solid-state sintering of deposited particles of $LaCrO_3$ doped with Sr, Mg, Ca, Ba or Co coated with calcium oxide and/or chromium oxide. The calcium oxide and chromium oxide coating lowered the sintering temperature from about 1700° C. to between about 1300° C. to 1550° C. without substantial loss of volatile Cr and/or chromium oxides from the interconnection material, and provided greater inclusion of Ca dopant into the interconnection material, and also provided a 95% densified, doped gas-tight interconnection material. However, high temperature sintering of the doped $LaCrO_3$ particles coated with CaO and $Cr_2O_3$ to produce an interconnection material on the air electrode can result in problems. These problems include Mn leaching from the air electrode into the interconnection material and diffusion of the interconnection material dopant into the air electrode.

U.S. Pat. No. 4,895,576 (Pal, et al.), in another approach, taught forming a layer of metal oxide particles selected from the group oxides of Ca, Sr, Co, Ba and Mg, for example, CaO, $CaO_2$, SrO, $SrO_2$, CoO, $Co_2O_3$, BaO, $BaO_2$, MgO, or $MgO_2$, on the interconnection portion of a fuel cell air electrode, heating the air electrode to about 1300° C. to 1450° C., modified electrochemical vapor depositing a skeletal structure of lanthanum chromite around and between the metal oxide particles using halide vapors of lanthanum and chromium, and annealing at temperatures between about 1100° C. to 1400° C. to further cause the metal ions of the metal oxide particles to diffuse in the bulk of lanthanum chromite interconnection material to provide an electrically conductive interconnection. This process requires an additional long term annealing step to maximize conductivity. Some of the dopant can also diffuse into the air electrode at such high temperatures.

None of these techniques, however, solve all the potential problems of thermal expansion mismatch, Mn leaching from the air electrode, dopant leaching from the interconnection material, and problems associated with doping Ca, Sr, Co, Ba and other materials by vapor deposition or of providing a uniformly thick, dense, leak tight, well-bonded, electrically conductive interconnection layer on a variety of substrates in a simple and economical fashion. Many of these problems, including doping and leak tightness, appear to be dictated by the process used to from the interconnection material. There is a need for a method of forming an interconnection layer on an electrode of an electrochemical cell which provides a highly doped, substantially gas-tight, electrically conductive interconnection material without the associated problems.

Plasma arc spraying and flame spraying, i.e., generally known as thermal spraying or plasma spraying, are well-known film deposition techniques. Thermal spraying involves spraying a molten powdered metal or metal oxide onto the surface of a substrate using a thermal or plasma spray gun. U.S. Pat. No. 4,049,841 (Coker, et al.) generally taught plasma and flame spraying techniques. U.S. Pat. Nos. 3,823,302 (Muehlberger) and 3,839,618 (Muehlberger) generally taught plasma spray guns.

Plasma spraying is a technique that has been used for fabrication of some components, other than the interconnection material, in a high temperature, solid oxide electrolyte, electrochemical cell. Plasma spraying, however, has not been effectively used for the fabrication of the interconnection material. Attempts to plasma spray an interconnection material on an electrode structure of an electrochemical cell have been found to remain porous after cell processing, and, further, to lead to intermixing of the fuel and oxidant during cell operation. Gas can pass through such a structure, whereas prior electrochemical vapor deposition and sintering techniques provided a closed pore structure. This intermixing of fuel and oxidant resulting from leakage through the interconnection microstructure is detrimental to electrical power generation, and also to the stability of the cell. Other attempts to plasma spray an interconnection material on an electrode structure of an electrochemical cell have been found to deposit an interconnection material that is not stoichiometric in distinct regions, and further lead to hydration and cracking in these regions. Accordingly, the efficiency and life expectancy of the electrochemical cell are substantially reduced. It is, therefore, desirable for long term electrochemical cell operation and component stability to provide a substantially leak tight, substantially hydration-free, as well as a substantially electrically conductive interconnection.

None of the references teach or suggest effectively plasma spraying an interconnection material, particularly plasma spraying a compensated interconnection powder, and providing a plasma sprayed interconnection that is substantially leak tight, hydration-free and electrically conductive. There is a need to provide a dense, substantially gas-tight, highly doped, electrically conductive interconnection material for use in an electrochemical cell generator. There is a further need to provide an interconnection material that is substantially free of pores, at least at a surface thereof, and also substantially doped by a plasma spray deposition and densification technique, thereby forming an effective gaseous diffusion barrier and an electrically conductive interconnection. There is also a particular need to effectively compensate the plasma spray interconnection feed powder to avoid problems in the interconnection caused from the differential volatilization of certain constituents of the interconnection composition during plasma spraying.

SUMMARY OF THE INVENTION

It is an object of the invention to provide a dense, substantially gas-tight, and also highly doped, electrically conductive interconnection material used in an electrochemical cell.

It is another object of the invention to provide an effectively compensated plasma sprayed, e.g. plasma arc sprayed, flame sprayed or the like, interconnection material on an electrode structure of an electrochemical cell which is substantially gas-tight (i.e., substantially closed pores), hydration-free, well-bonded, highly doped, and electrically conductive.

It is yet another object of the invention to provide a method of forming and densifying a compensated plasma sprayed interconnection layer on an electrode surface of an electrochemical cell.

It is a feature of the invention to plasma spray a sufficiently compensated interconnection powder to form a stoichiometric doped lanthanum chromite interconnection layer on an electrode surface of an electrochemical cell.

It is an advantage of the invention to compensate the plasma spray interconnection feed powder to account for the differential volatilization of certain interconnection composition components, and accordingly provide a substantially hydration-free interconnection.

It is an advantage of the invention to provide a highly doped interconnection material.

It is another advantage of the invention to provide a densified and gas tight plasma sprayed interconnection material.

The invention resides in a method of forming dense, high temperature electrically conductive interconnection layer on a porous, electrically conductive electrode structure of an electrochemical cell, characterized by the steps of: (A) providing a porous electrode structure; (B) forming by thermal spraying a compensated doped $LaCrO_3$ plasma spray feed powder, preferably chromium compensated, preferably by plasma arc spraying, on a selected portion of the porous electrode surface, a layer of doped $LaCrO_3$ particles, to form a porous, electrically conductive interconnection material bonded to the electrode surface; and, (C) heating the interconnection material layer to temperatures of about 1100° C. to 1400° C., preferably 1100° C. to 1300° C., to substantially close the pores of said porous thermally sprayed interconnection layer, to form a dense, substantially gas-tight, hydration-free, electrically conductive interconnection layer bonded to the electrode surface. Preferably, prior to thermal spraying, the doped LaCrO$_3$ particles are agglomerated by spray drying, sintering or the like to form generally spherical particles that are freely flowing. Further, prior to thermal spraying, the doped LaCrO$_3$ particles are sufficiently compensated with increased amounts of Cr$_2$O$_3$ and/or dopant oxides to compensate for loss during thermal spraying by differential volatilization.

The invention further resides in a high temperature, solid oxide electrolyte electrochemical cell capable of electronic interconnection to at least one other electrochemical cell, characterized by: a first electrode; a solid electrolyte disposed on a first portion of the first electrode; a second electrode disposed on a portion of the solid electrolyte; and, an electrically conductive substantially gas-tight interconnection material disposed on a second portion of the first electrode and capable of allowing electronic interconnection to at least one other electrochemical cell, wherein the interconnection material is further characterized by a thermally compensated sprayed doped LaCrO$_3$ porous layer heated to temperatures of about 1100° C. to 1400° C. to substantially close the pores of the thermally sprayed doped LaCrO$_3$ layer. The interconnection layer is preferably electrically connected to an interconnection of at least one other electrochemical cell in series. The first electrode is optionally applied to a support comprised of calcia stabilized zirconia, the first electrode can be an air electrode preferably of lanthanum manganite, the electrolyte is preferably yttria stabilized zirconia, and the second electrode can be a fuel electrode preferably of nickel-zirconia or cobalt-zirconia cermet.

Additional embodiments and aspects of the invention will be apparent from the following discussion of particular examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

Figure 1:
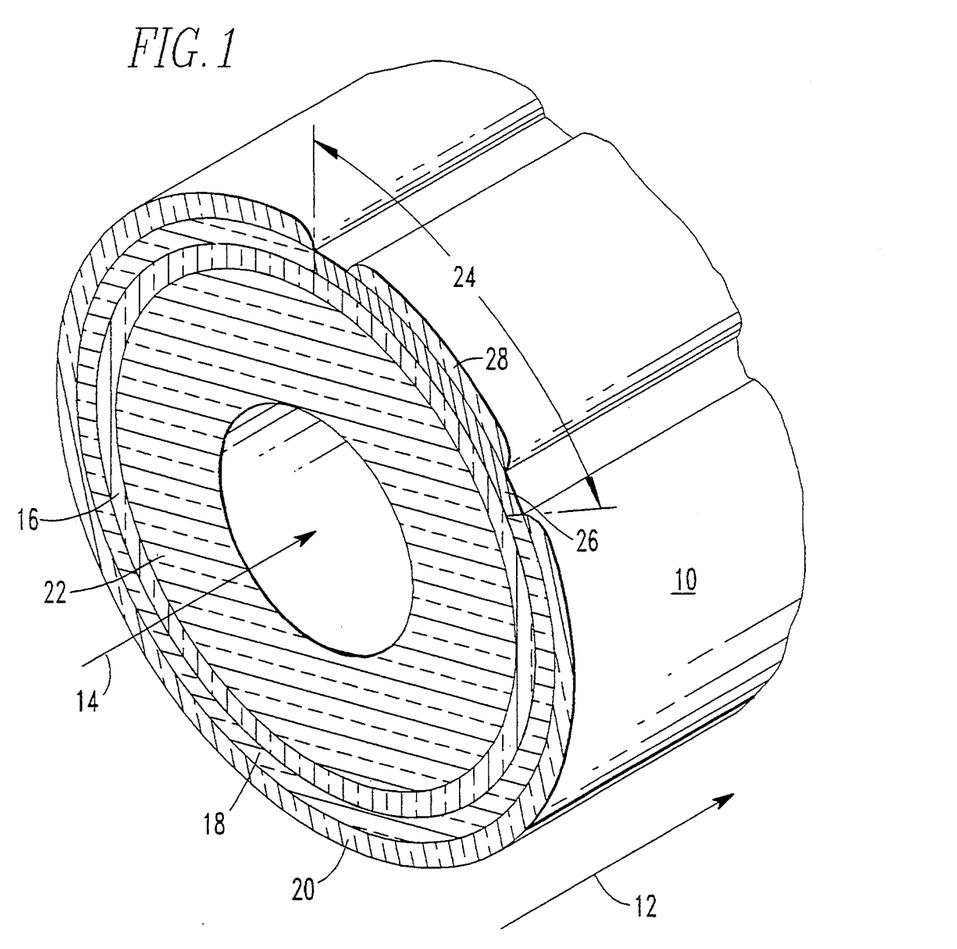
FIG. 1 is a schematic sectional view of a preferred embodiment of a single, tubular, electrochemical cell, showing the interconnection layer formed by the method of the invention.

Referring now to FIG. 1, a preferred, tubular, electrochemical cell 10 is shown. The preferred configuration is based upon a fuel cell system wherein a flowing gaseous fuel, such as hydrogen, carbon monoxide or unreformed hydrocarbon gases, is directed axially over the outside of the cell, as indicated by the arrow 12, and an oxidant, such as air or O$_2$, is directed axially through the inside of the cell, as indicated by the arrow 14. Where the cell is as shown, oxygen molecules pass through a porous, electrically conductive air electrode structure 16 and are converted to oxygen ions which pass through a gas-tight electrolyte 18, to combine with the fuel at a porous, fuel electrode 20.

The following description of the preferred tubular configuration should not be considered limiting in any manner, since it is possible that other configurations for the electrochemical cell 10 could be used, for example, planar shaped cells. The interconnection material of this invention, described and claimed hereinafter, could be applied to a variety of substrates and to electrochemical cells other than fuel cells. The location of the fuel and oxidant can also be interchanged such that oxidant flows over the outside of the cell and the fuel flows through the inside of the cell. This requires the reversal of the cell electrodes and is called an "inverted" cell.

In the case of fuel cells, the term "air electrode" as used herein means that electrode which will be in contact with the oxidant, and "fuel electrode" means that electrode that will be in contact with the fuel. The term "electrically conductive" as used herein means conducting electrons but not substantially conducting ions. The term "to compensate" as used herein means to counterbalance the effects of differential volatilization of certain constituents of the sprayed interconnection composition which occurs during plasma spraying by increasing the amounts of the volatile constituents in the plasma spray feed powder.

The electrochemical cell 10 can include an optional, porous support tube 22. This support tube can be comprised of calcia stabilized zirconia forming a porous wall approximately one to two millimeters thick. The air electrode or cathode 16 is a porous, composite metal oxide structure approximately 50 microns to 1500 microns (0.05 millimeter to 1.5 millimeters) thick. The air electrode can be deposited on the support tube by well known slurry dip and sinter techniques, or extruded as a self-supporting structure. The air electrode is, for example, comprised of doped oxides or mixtures of oxides of the perovskite family, such as, LaMnO$_3$, CaMnO$_3$, LaNiO$_3$, LaCoO$_3$, LaCrO$_3$, and the like. Preferred dopants are strontium, calcium, cobalt, nickel, iron, tin, barium, cerium, and the like.

Surrounding most of the outer periphery of the air electrode 16 is a layer of dense, gas-tight solid electrolyte 18. The electrolyte is, for example, comprised of yttria stabilized zirconia that is about 1 micron to about 100 microns thick (0.001 millimeter to 0.1 millimeter). The electrolyte can be deposited onto the air electrode by well known, high temperature, electrochemical vapor deposition techniques. In the case where the electrolyte is to be deposited before the interconnection material, a selected radial segment or portion 24 of the air electrode 16 is masked during electrolyte deposition to make the electrolyte discontinuous for inclusion of a layer of dense, substantially gas-tight, electrically conductive, interconnection material 26 which is deposited on this segment or portion 24. If the interconnection material is to be deposited first, then the electrolyte portion of the air electrode is masked initially.

The dense interconnection material 26, which preferably extends the active axial length of each elongated cell 10 as shown, must be electrically conductive in both an oxidant and fuel environment. The gas-tight interconnection 26 is roughly similar in thickness to the electrolyte, approximately 30 microns to about 100 microns (0.03 millimeter to 0.1 millimeter) thick. The interconnection should be non-porous, at least on a surface, preferably over about 95% dense, even more preferably over about 99% dense, and preferably be highly electrically conductive at temperatures of about 1000° C., the usual operating temperature of a fuel cell. The interconnection, therefore, should be dense enough to be substantially leak proof and also have a coefficient of thermal expansion close to that of the solid electrolyte and the electrode onto which it is deposited, and the other components, including the support tube, if used. A preferred interconnection material is the doped oxide of lanthanum chromite ($LaCrO_3$) of the perovskite family having the chemical formula $ABO_3$ in which the A site represents the larger ions and the B site represents the smaller ions. Other doped oxides of the perovskite family used for the interconnection can be A ions selected from the group of La, Ca, Sr, and Ba and B ions selected from the group of Cr, Mn, Mg, Ti, Fe, Co, and Ni.

Substantially surrounding the solid electrolyte 18 is a fuel electrode or anode 20 which is porous. The fuel electrode 20 is, for example, comprised of nickel-zirconia or cobalt-zirconia cermet. As shown, the fuel electrode 20 is also discontinuous, being spaced from the interconnection 26 a distance sufficient to avoid direct electrical communication between the fuel electrode 20 and both the interconnection 26 and the air electrode 16. The fuel electrode is approximately 100 microns (0.1 millimeter) thick. The fuel electrode can be deposited on the electrolyte, for example, by electrochemical vapor deposition techniques, where nickel particles are anchored to the electrolyte surface by a vapor deposited skeleton of electrolyte material.

Usually, an electrically conductive top layer 28 is deposited over the interconnection layer 26. This top layer preferably comprises the same material as the fuel electrode, i.e., nickel-zirconia or cobalt-zirconia cermet, and is about the same thickness, approximately 100 microns (0.1 millimeter) thick. Also a thin (10 micron) layer of nickel metal (not shown) may be applied by electroplating or by thermal spraying.

Figure 2:
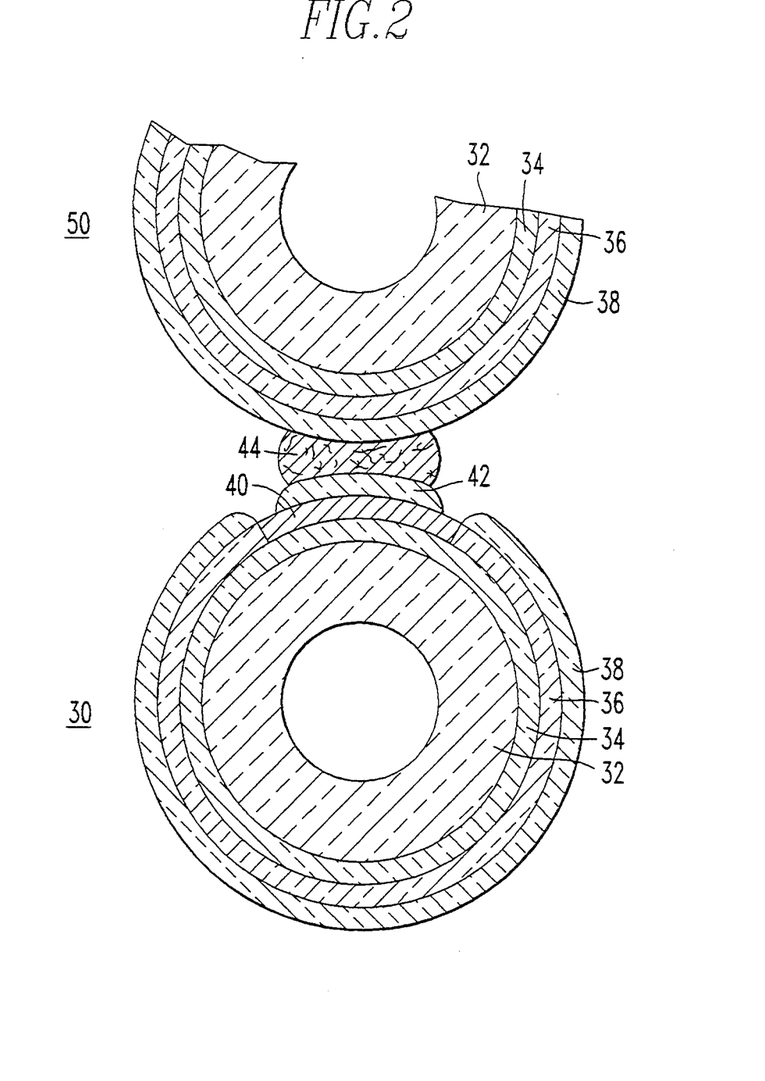
FIG. 2 is a schematic sectional view of two adjacent electrochemical cells, electrically connected by the interconnection layer formed by the method of the invention.

This completes the formation of an electrochemical cell. The interconnection serves as an electronic interconnection to an electrode of a second electrochemical cell. The electrical connection is made along the axial length of the interconnect through a metal fiber felt 44 (as shown in FIG. 2). Each fuel cell is preferably tubular and is electrically connected, at least, in series to an adjacent fuel cell, although serial and parallel arrangements are possible. A typical single cell can generate an open circuit (unloaded) voltage of approximately one volt, and multiple cells can be connected in series and/or in parallel in order to provide a desired system voltage and current from the electrochemical generator as a whole.

Referring to FIG. 2, an electrochemical cell 30 is electrically connected in series to an adjacent electrochemical cell 50 along an interconnection 40 as shown. The first electrochemical cell 30 includes a porous support tube 32 and a porous, tubular, inner air electrode 34 generally surrounding the porous support tube. Generally surrounding the air electrode 34 is a solid electrolyte 36. Substantially surrounding the electrolyte is an outer fuel electrode 38. A selected radial segment of the air electrode is discontinuous and contains a non-porous, gas-tight, electrically conductive interconnect 40 along the discontinuity. As shown in FIG. 2, the fuel electrode 38 is also discontinuous, being spaced from the interconnection 40 a distance sufficient to avoid direct electrical communication between the fuel electrode 38 and both the interconnection 40 and air electrode 34. Deposited over the interconnection 40 is an electrically conductive layer 42 which is preferably made of the same material as the fuel electrode 38.

In the example shown, a second electrochemical cell 50 is connected in series to the first electrochemical cell 30 along the electrically conductive interconnection 40, preferably extending the axial length of the fuel cell. The electrical interconnection is preferably enhanced by an optional metal fiber felt 44, for example, made of nickel fibers. The felt extends axially between the annular cells 30 and 50. In an inverted cell structure (not shown), where fuel flows inside the cells and the electrodes are reversed, the felt material is made from conducting oxide fibers, such as doped $In_2O_3$ or the like.

During operation, oxidant, such as air or $O_2$, flows through the center of the cells, and fuel, such as $H_2$ or CO, passes over the exterior. Oxygen molecules diffuse through the optional porous support and air electrode or cathode. Fuel diffuses through the fuel electrode or anode. Oxygen ions pass through the electrolyte. These reactants interact via the actions of the electrolyte and electrodes in generating products such as water vapor, carbon dioxide, as well as heat and electrical energy. The high temperature water vapor and carbon dioxide are carried away, for example, with unburned fuel and electrical power is transferred in series from the inner cathode 34 of one cell, through the electrically conductive interconnect 40, and metal felt 44, to the outer anode 38 of the second cell, and ultimately the electrical power is usefully drawn through the load via leads (not shown). The use of highly conductive interconnection is important to the fuel cell generator operation.

Undoped lanthanum chromite is not very useful as an electronic interconnection, due to its combination of marginal conductivity and mismatch of thermal expansion coefficients with the rest of the fuel cell components. Doped lanthanum chromite, however, has excellent properties as an electronic conductor, and also, doping can improve (increase) the coefficient of thermal expansion, so that a better expansion match is obtained with the rest of the fuel cell components. Presently used lanthanum chromite interconnections are produced by electrochemical vapor deposition (EVD) or sintering at relatively high temperatures.

The interconnection materials should be non-porous, have a resistivity of less than 50 ohm-cm at 1000° C., and preferably be highly electrically conductive without substantial resistivity at 1000° C., the usual operating temperature of the fuel cell. It should also have other properties, such as, a moderate material cost, nearly unvarying composition in both fuel and oxidant atmospheres, be non-reactive with other cell components at 1000° C., have negligible metal ion and oxide ion conduction, be free of destructive phase transformations in the region from 25° C. to 1200° C., have low volatility of oxide components in the working atmosphere, and be fabricable as a thin layer impervious to oxygen gas and have low ionic conductivity when exposed to a fuel atmosphere at 1200° C. Also, the interconnection material should have a coefficient of thermal expansion close to that of the solid electrolyte and the electrode on which it is deposited, and the other components, including the optional support tube, to provide good longevity over cycles of temperature variation.

The interconnection material of the invention has surprisingly been found to be suitable in all these categories. The interconnection material of the invention comprises a thermally sprayed, preferably a plasma arc sprayed, and heat treated doped lanthanum chromite ($LaCrO_3$) layer formed onto an electrode surface of an electrochemical cell and a method of making the same. Preferred dopants are Ca, Sr, Ba, Mg, Co, Ni and Al or mixtures thereof. The plasma spraying interconnection deposition and heat densification technique of the invention provides a highly doped interconnection material which improves the electrical conductivity thereof, in contrast to electrochemical vapor deposition, as well as a dense, gas-tight, interconnection layer which provides gas stopping power and does not allow intermixing of fuel and oxidant, i.e., combustion and reduction in power during electrochemical generator operations. The technique of the invention further provides an interconnection layer that has a substantially reduced susceptibility to hydration and disintegration upon exposure to humid conditions by compensating the plasma spray feed powder with increased amounts of volatile interconnection constituents of the interconnection composition.

Plasma arc sprayed interconnection materials characteristically have been found by the inventors to remain porous after cell fabrication, typically about 5 to 15% by volume porous (85 to 95% of theoretical density), and, accordingly, are considered to lead towards intermixing of fuel and oxidant during electrochemical cell operations which is undesirable. Such intermixing of fuel and oxidant not only reduces the efficiency of the generator due to localized burning of the fuel (as opposed to generation of electrical power), but also degrades the cell components, such as the interconnection and the air and fuel electrode, reducing the life expectancy and reliability of the cells and the generator. Moreover, plasma arc spraying techniques have been found by the inventors to cause differential volatilization of some of the interconnection material constituents, typically chromium as $Cr_2O_3$, which can result in an interconnection material being slightly off chemistry, i.e., not stoichiometric, in distinct regions which is undesirable. For example, typically the plasma arc spraying of uncompensated doped lanthanum chromite powder typically from differential volatilization of chromium results in lanthanum-rich bands or phases in the form of lanthana. Lanthana is a compound that hydrates under humid conditions and consequently cracks and disintegrates the plasma sprayed interconnection. In addition, plasma arc spraying techniques have also been found by the inventors to cause micro-cracks and macro-cracks in the sprayed layer resulting from stresses that are developed when the molten deposit freezes and cools down to the electrode substrate temperature which is undesirable.

However, for prolonged cell life and stable component structures, substantially leak proof, hydration-free and highly doped interconnection layers are desirable. The plasma spraying and heat treating technique used for forming an interconnection layer on an electrode of an electrochemical cell according to the method of the invention, provides a highly doped, dense, substantially gas-tight, well-bonded, stable, hydration-free, electrically conductive interconnection layer onto an electrically conducting electrode substrate. Plasma spraying the interconnection layer by the method of the invention provides a highly doped, electrically conductive interconnection material which is less sensitive to degradation at cell operating temperatures while exposed to dual gas atmospheres (fuel gas & oxidant), i.e., steep oxygen potential gradients across the interconnection layer thickness and also while exposed to a humid environment. The gas-tightness of the plasma sprayed interconnection layer can be further enhanced by certain post treatments such as by heat densification according to the method of the invention and further by flux tape densification or EVD densification.

In the method of the invention to form a dense, gas-tight, highly doped, electrically conductive interconnection material, doped particles of lanthanum chromite ($LaCrO_3$) are made or obtained. Typically the doped $LaCrO_3$ are made by well known techniques such as solid-state reaction or solution derived techniques, as taught in U.S. Pat. No. 3,330,697 (Pechini), which is hereby incorporated by reference. Preferred dopants are at least one of Ca, Sr, Ba, Mg, Co, Ni and Al, distributed throughout the interconnection material. Particularly, doped oxides of the perovskite structure $ABO_3$ are preferred, preferably doped $LaCrO_3$ particles, preferably having the general formula $La_{1-x}M_xCr_{1-y}N_yO_3$, where M is a dopant selected from the group of Ca, Sr, Ba, or mixtures thereof, N is a dopant selected from the group of Mg, Ni, Co, Al, or mixtures thereof, and x and y are each independently about 0.075–0.25.

The doped $LaCrO_3$ particles obtained can then be agglomerated by well known agglomeration techniques to provide a freely flowing plasma spray feed powder. It is preferred that the plasma spray feed particles have a uniform particle size distribution with an average particle size range of from about 7 to 52 microns in diameter, preferably from about 10 to 44 microns in diameter, and preferably are freely flowing to facilitate plasma spraying. A coarser particle size range (−200 to +400 U.S. screen mesh) and about 36 microns to 52 microns in diameter can also be used, although finer particles are generally preferred. A narrow average particle size range, such as 10–44 microns in diameter, is preferred for precision injection, higher melting, lower differential volatilization of the interconnection constituents, e.g. chromium and/or dopant, and more uniform splat formation.

A preferred method of making doped $LaCrO_3$ particles having large agglomerate sizes, more spherical shapes (with low frequency of broken agglomerates)

and narrow monodisperse particle size distributions and which are also freely flowing is by spray drying techniques. In spray drying, small constituent particles are adhered by a binder, typically organic, which burns off in the plasma during plasma spraying. A more detailed description of spray drying is described in Keith Masters, *Spray Drying Handbook*, Halsted Press Div., John Wiley and Sons, NY, N.Y. (1985), which is hereby incorporated by reference. Another agglomeration technique which can be used to make doped $LaCrO_3$ particles is, e.g., by sintering such particulate materials at substantial pressures and temperatures up to 1700° C. Care must be taken to maintain the desired La/Cr or doped La/doped Cr ratios in the agglomerated powder to spray an interconnect strip having a desired chemistry.

The physical properties of the agglomerated powders are significant as they affect powder mass flow rate in feeding the plasma plume. A powder which flows freely allows the feed rate of the powder to be more uniformly controlled by the volumetric or fluidized bed type powder feeder to the plasma spray gun. Advantageous consequences of a more uniform powder flow are a more homogenous microstructure and better coating thickness control. Particularly, larger agglomerate sizes and more spherical agglomerates (with lower frequency of broken agglomerates) result in more freely flowing powders. Moreover, monodisperse or narrow particle size distributions, i.e., small standard deviation of the agglomerate particles size distribution, result in better flowability, since broad particle size distributions tend to pack and readily bridge at changes of flow cross section in the plasma spray gun feeding systems. Also, particles smaller than optimum will overheat and volatilize and particles larger than optimum will not completely melt. The agglomeration techniques, preferably spray drying, therefore provide for optimal powder flow and spray parameters.

Particularly with respect to a spray dried spray feed powder, it can be improved by holspherizing. Holspherizing is a well known technique where spray dried agglomerated powder is thermally sprayed into space and frozen particles are collected and sleeved into the requisite size distributions. In such case, the spray dried powder should be sufficiently compensated with $Cr_2O_3$ and dopant to compensate for volatilization thereof during holspherizing.

In the method of the invention, the doped $LaCrO_3$ particles, preferably agglomerated powders, are next thermally sprayed, or in other words plasma sprayed, e.g., by plasma arc spraying or by flame spraying techniques, preferably plasma arc spraying, onto portions of the surface of an electrode structure, e.g., selected portions of an air electrode of an electrochemical cell. These and similar techniques to hot spray metal or metal oxide containing powders will be considered covered by the term "thermal spraying" or "plasma spraying" as used herein. More detailed descriptions of thermal spraying techniques are taught, for example, in U.S. Pat. Nos. 4,049,841 (Coker, et al.) and 5,085,742 (Dollard, et al.), which are hereby incorporated by reference. Plasma spray guns or torches used in plasma spraying are taught generally, for example, in U.S. Pat. Nos. 3,823,302 (Muehlberger) and 3,939,618 (Muehlberger), which are hereby incorporated by reference.

Among the thermal spraying techniques, plasma arc spraying can be used in the method of the invention. Plasma arc spraying generally is a high power or high energy technique which comprises an electric arc discharge through which a gas such as argon, hydrogen, helium, nitrogen, etc., is passed. As the gas passes the electric arc, it is ionized to obtain a plasma of ionized gas. The plasma is then mixed with a powder metal or metal oxide, e.g., doped $LaCrO_3$ powder with excess $Cr_2O_3$, which is suspended in a carrier gas such as argon and which becomes entrained in the plasma gas. A plasma spray gun is used to discharge the high energy plasma gas, whereby the entrained metal or metal oxide powder is directed to impinge upon a substrate whereupon a metal or metal oxide film is formed, the film consisting of many layers of overlapping, thin, lenticular particles or splats.

In the method of the invention, an interconnection material powder, for example, doped $LaCrO_3$ particles with excess $Cr_2O_3$, preferably freely flowing agglomerated particles, are suspended in a carrier gas, such as argon, nitrogen or the like and the suspension is then passed through an arc discharge containing ionized plasma gas, such as, argon, hydrogen, helium or the like and mixtures thereof. The interconnection particles are heated by the plasma gas to their molten state and ejected from a nozzle of a plasma spray gun onto a substrate. Plasma arc spraying, therefore, involves fusing a metal or metal oxide containing powder onto a surface of a substrate. The arc temperature causes a molten droplet of metal or metal oxide to impinge on a surface of a substrate and freeze thereon.

Another thermal spraying technique, such as flame spraying, can also be used in the method of the invention. Flame spraying generally comprises spraying and fusing a powdered metal or metal oxide onto a surface with a flame spraying torch, typically an acetylene oxide torch. Flame spraying techniques are generally taught in U.S. Pat. Nos. 2,786,779, 3,238,060, and, 3,220,068, which are hereby incorporated by reference. Plasma arc spraying however is preferred since it provides a higher temperature than flame spraying, and, consequently results in a greater degree of powder melting and facilitation of bonding. It has surprisingly been found that thermal spraying techniques, especially plasma arc spraying techniques, used to deposit an interconnection material on an electrode of an electrochemical cell provide for the formation of highly doped, electrically conductive interconnection layers and further provide distinct advantages over conventional electrochemical vapor deposition and sintering techniques.

The inventors have found, on the one hand, that either plasma arc spraying or flame spraying an interconnection layer on an electrode surface both produce insufficient coating densities, typically about 85% of theoretical density, i.e., about 15% porous, such that a gas can pass through the structure, whereas prior electrochemical vapor and sintering techniques provided closed pore structures. A plasma sprayed interconnection layer that is not leak tight, can lead towards intermixing of fuel and oxidant during cell operations which is undesirable. Also, the inventors have found that plasma arc spraying doped $LaCrO_3$ can result in an interconnection being slightly not stoichiometric in distinct regions being a hydroscopic lanthanum-rich phase in these regions that are susceptible to cracking and disintegrating. However, on the other hand, plasma arc or flame spraying techniques are desirable, since they allow for the formation of highly doped, electrically conductive interconnection layers which provide distinct advantages over the electrochemical vapor deposition and sintering techniques. Thus, the inventors have focused on a method to use the advantageous aspects of forming a highly doped interconnection by using a thermal spraying technique while also providing a substantially leak-tight and substantially hydration-free interconnection structure by using a compensation and densification technique which allows the thermally sprayed interconnection to effectively function as an electrical interconnect between adjacent electrochemical cells and avoids the disadvantageous aspects of thermal spraying.

In the method of the invention, where plasma arc spraying is used as the thermal spraying technique, it has been found that a suitable high energy plasma spray can be generated employing an arc discharge having a voltage of about 30 to 60 volts and a current of about 400 to 900 amperes. The arc discharge is preferably about 20 to 40 kilowatts, most preferably about 22 kilowatts. The temperature in the thermal plasma at these power conditions can approach 15,000° C. Such a plasma spray can be generated by a variety of commercial devices, for example, a Miller Thermal Plasma Spray Gun, Model No. SG-100, having an anode, Model No. 2083-175. A preferred plasma spray gun includes a large bore nozzle. It further includes a perpendicular powder injection angle, as opposed to a backward injection angle, which produces the least amount of $Cr_2O_3$ and/or dopant differential volatilization over the particle size range. A backward injection angle can be used if the powder is sufficiently compensated with $Cr_2O_3$, and also with the dopant. The plasma spray gun further includes an oxide powder feeder, such as a volumetric, vibratory or fluidized bed feeders.

It is further preferred that the plasma gas comprises Ar primary gas, for example, about 8 to 40 slpm (standard liters per minute), and $H_2$ or He secondary gas, for example, about 0.15 to 2 slpm, when spraying in air (as opposed to spraying in a vacuum which also is possible). Hydrogen as a plasma secondary gas added to the primary argon gas increases the ability of the plasma gas to melt refractory oxides and also increases the velocity of the plasma gas. Helium as a secondary gas by comparison imparts less heat content to the plasma gas. Care must be taken to avoid high volatilization of the constituent oxides from the oxide powder however. It is also preferred that the doped $LaCrO_3$ powder feed rate is in the range of preferably 6 to 20 grams per minute, with the use of vibratory feeders. The powder carrier gas, typically argon, flow rate is preferably about 1 to 4 slpm. The plasma spray distance between the plasma gun nozzle and the substrate in air is preferably 3 inches or less, more preferably 2.5 inches. The spray distance to the substrate is to be held to within 1 to 2 mm of the selected spray distance. The plasma spraying can also be performed in a vacuum. However, in a vacuum there is greater thermal coupling of the plasma plume with the substrate increasing the possibility of thermal shock damage to ceramic substrates, such as the air electrode.

It is also preferred that the plasma be directed perpendicular to the substrate. Low angle spraying of the molten droplets tends to produce porosity in the deposit and should be avoided. Moreover, since the metal oxide powder feed rate is high and the spray distance is close, the plasma spray gun is traversed along the selected axial segment of the electrode, for example, the air electrode of an electrochemical cell, at a constant velocity, preferably greater than 40 meters per minute (67 cm per sec.). Preferably the movement transverse to the axial direction is incremental in order to deposit successive overlapping strips or splats. It has also been found that a number of passes of the plasma spray gun over the selected portions of the electrode may be required to provide a uniformly thick coating.

Figure 3:
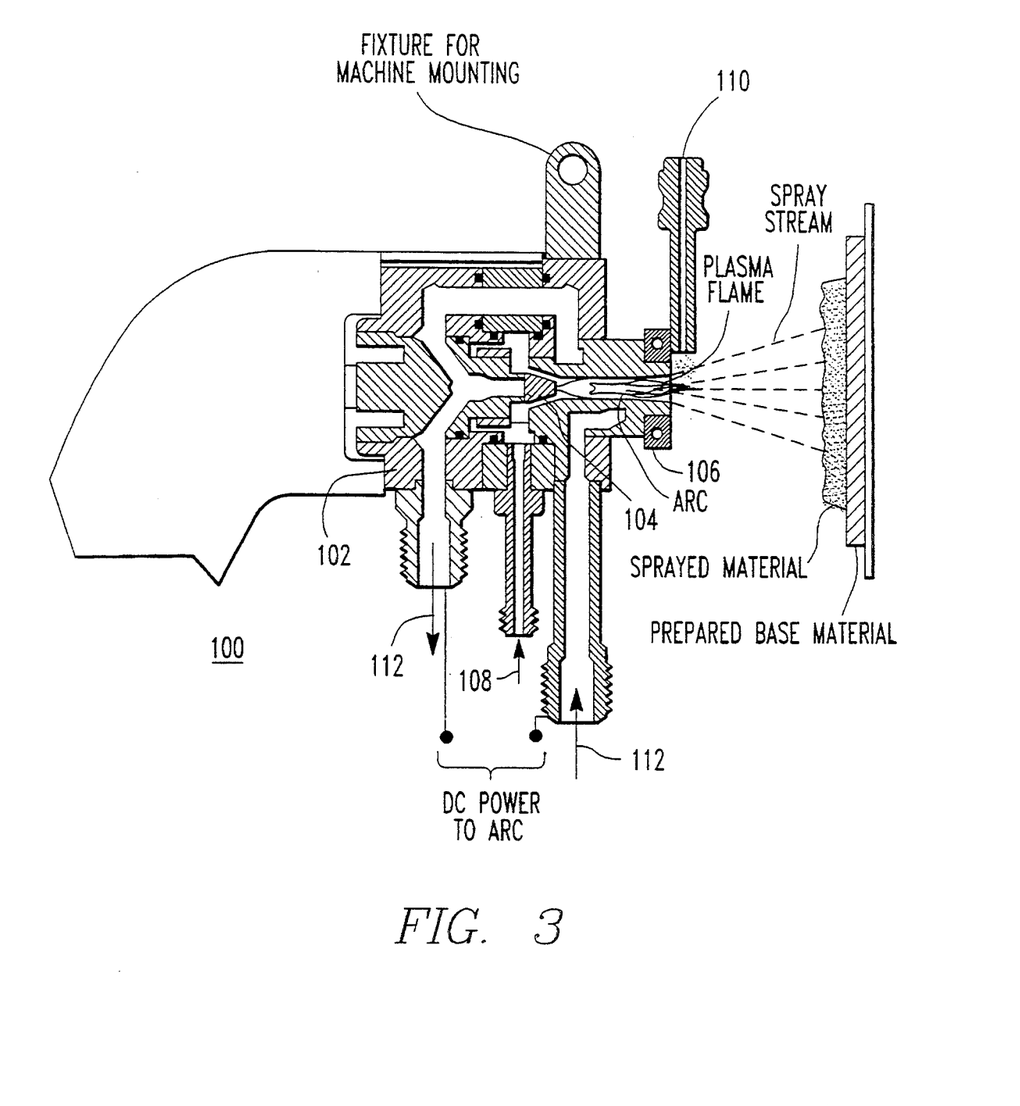
FIG. 3 is a schematic of a plasma arc spray gun which can be used to deposit the interconnection by the method of the invention.

A schematic of a typical plasma arc spray gun 100 is shown in FIG. 3. The spray gun includes a cone-shaped cathode 102 inside of a cylindrical anode 104 which extends beyond the cathode to form a nozzle 106. An inert gas, typically argon with an admixture of hydrogen, flows through a conduit 108 between the electrodes 102, 104 where it is ionized to form a plasma. Another conduit 110 directs powdered coating material, such as powdered doped and compensated $LaCrO_3$ powder, and carrier gas such as argon into the jet of the plasma that develops in the nozzle. Water or coolant is circulated through passages 112 in the anode and cathode to prevent melting of the electrodes. The powdered plasma spray interconnection feed powder is heated to a molten state while being accelerated by the carrier gas stream through the high power electric arc and directed in air or in a vacuum at the air electrode substrate (the surface to be coated), and on impact, forms a coating comprising many layers of overlapping, thin, lenticular particles or splats. Successive splats interlock mechanically and also in ceramic coatings, sintering can consolidate the deposits.

A problem discovered in plasma spraying of doped lanthanum chromite powder is the volatility of the sprayed materials. Pure and doped lanthanum chromites have appreciable volatility. The volatility is preferentially of chromium in the form of chromic oxide ($Cr_2O_3$). The technique of thermal spraying, especially plasma arc spraying the interconnection powder, e.g. doped $LaCrO_3$, therefore volatilizes some of the constituents of the interconnection material composition during spraying which is undesirable. For example, a strontium doped lanthanum chromite interconnection material having the formula. $La_{0.84}Sr_{0.16}CrO_3$ (or generally $La_{1-x}M_3Cr_{1-y}N_yO_3$, where N is Sr, and x is about 0.16 and y is 0) has been found to result in an interconnection layer being slightly off chemistry, i.e., not stoichiometric in distinct regions, due to volatilization of $Cr_2O_3$ and to a lesser extent dopant, SrO, from the powder during spraying, which forms, an undesirable a lanthanum-rich phase as well as a Sr-doped $LaCrO_3$ stoichiometric base phase.

Since chromium preferentially volatilizes during plasma spraying of stoichiometric doped lanthanum chromite interconnection layers, the resultant sprayed deposit contains chromium-deficient lanthanum chromite or in other words, excess lanthanum in the form of lanthana ($La_2O_3$). Lanthana is a compound that hydrates upon exposure to a humid environment which would result in the cracking and disintegration of the plasma sprayed interconnection. The inventors have focused on a technique to eliminate the presence of lanthana by adequately compensating the starting plasma spray feed powder with excess chromium. If the plasma spray produces a deposit with excess chromium, this is not deleterious, since excess chromium, present as chromium oxide, in the interconnection layer aids sintering during subsequent densification to achieve a substantially gas-tight interconnection. Also, the electronic conductivity and stability of the interconnection is not adversely affected.

To avoid chromium and/or dopant loss due to volatilization, it has been found particularly advantageous to adequately increase (compensate) the amounts of the volatile constituents, e.g., excess chromium, proportionately in the interconnection spray feed powder, e.g., Sr-doped $LaCrO_3$ spray feed powder, preferably spray dried particles, in order to spray a interconnection material coating that has a final bulk chemistry either equal to stoichiometric, e.g. $La_{0.84}Sr_{0.16}CrO_3$ where $La+Sr/Cr=1.0$, or any desired chemistry. The presence of lanthanum-rich phases, particularly $La_2O_3$, when, e.g., $(La+Sr)/Cr>1.0$, however, may result in localized hydration under certain humid environmental conditions which is undesirable. As described above, this could result in disintegration of the interconnection. It is, therefore, preferred to sufficiently compensate the doped lanthanum chromite plasma spray feed powder with excess chromium as $Cr_2O_3$ and/or dopant to reduce the susceptibility to hydration and cracking by the presence of chromium-rich phases, particularly $Cr_2O_3$, when, e.g. $La+Sr/Cr<1.0$. The excess chromium in the bulk would also serve as a sintering aid during subsequent heat treatment. The preferred amount of chromium compensation is in the range of about 0.2 to 0.5 in excess of the chromium in the stoichiometric doped lanthanum chromite composition.

An example of an exemplary chromium compensated interconnection spray feed powder to be plasma sprayed onto the surface of an air electrode of a high temperature, solid oxide electrolyte, electrochemical cell is generally $La_{1-x}M_xCr_{1-y}N_yO_3 + zCr_2O_3$, where M is a dopant selected from the group consisting of Ca, Sr and Ba, N is a dopant selected from the group consisting of Mg, Co, Ni and Al, x and y are each independently 0.075–0.25, and $0.2 \leq z \leq 0.5$, or more particularly $La_{0.84}Sr_{0.16}CrO_3 + zCr_2O_3$ where $0.2 \leq z \leq 0.5$ to form substantially stoichiometric $La_{0.84}Sr_{0.16}CrO_3$ after cell processing densification. Because the $La_{0.84}Sr_{0.16}CrO_3$ stoichiometric composition is highly doped in the A site of the $ABO_3$ perovskite structure, a slight decrease in the Sr content will not significantly affect the physical, chemical and electrical properties of the interconnection material deposit. However, if desired, another dopant in the A or B site of the $ABO_3$ perovskite structure can be similarly compensated. The amount of compensation is calculated based on the final bulk chemistry desired in the interconnection. The excess $Cr_2O_3$, in some instances, forms an interconnection layer that is a mixture of phases of Sr doped $LaCrO_3$ stoichiometric base phase and chromium-rich phase after thermal spraying, for example, $La_{0.86}Sr_{0.14}CrO_3 + 0.2-0.5$ $Cr_2O_3$, onto the air electrode. The presence of a second phase of $Cr_2O_3$ is accomplished by plasma spraying a sufficient amount of the chromium compensated doped lanthanum chromite powder. The chromium-rich phase reduces the susceptibility of the plasma sprayed interconnection to hydration and aids in the subsequent densification step by facilitating sintering of the interconnection to a gas-tight structure.

Before formation of the plasma sprayed layer of interconnection material on the surface of the electrode, it is preferred that the substrate (air electrode) surface finish is about 60 rms (route mean square). If rougher than 60 rms, the substrate can be smoothed with, for example, 600 grit SIC or alumina paper by wet sanding for surface conditioning. Also air bubble defects in the substrate which result in defects in the deposit can be blended out by the sanding. Defects within the substrate below the deposit act as stress risers, and are consequently crack initiation sites when there is localized surface heating of the substrate during the spraying process. The elimination of substrate defects within or close to the surface can increase the thermal shock resistance of the substrate during the spraying process.

The technique of thermal spraying the interconnection powder has also been found to deposit an interconnection layer that develops, along with porosity, microcracks and macro-cracks within the coating. The doped $LaCrO_3$ interconnection, deposited by being plasma sprayed onto an electrode, tends to crack even when applied to an electrode composition having similar thermal expansion properties. Because there is a steep temperature gradient between the freezing deposit and the substrate during the cooling process, the deposit tends to shrink considerably more than the substrate during cooling. Most of these tensile stresses are relieved by cracking and separation of the splats. Depending on the magnitude of the volume accommodation, large cracks (macro-cracks) can extend down from the surface of the deposit to the substrate surface.

In order to minimize crack formation, the interconnection deposit can be sprayed on a substrate that is heated, for example, just to the freezing temperature of the molten sprayed powder. However, due to the unique ability of the preferred chromium compensated powder composition to close coating cracks upon the subsequent densification step due to the excess $Cr_2O_3$ in the Cr-rich phase, acceptable gas barrier films can be plasma sprayed onto room temperature substrates. For example, the $La_{0.84}Sr_{0.16}CrO_3 + Cr_2O_3$ rich phase compensated composition which results from the plasma spraying a $Cr_2O_3$ compensated composition has thermal expansion characteristics very similar to that of air electrodes, typically strontium or calcium doped lanthanum manganite.

The technique of thermal spraying the interconnection powder has been found to deposit an interconnection material onto an electrode surface that develops porosity in the electrically conductive interconnection material microstructure, typically approximately 85–95% of theoretical density (5% to 15% by volume porous) which is not gas-tight. As discussed above, the interconnection material needs to be substantially gas-tight so that the fuel and oxidant do not leak therethrough during electrochemical operations. It is therefore necessary to enhance the gas-tightness of this coating by a post treatment densification process in order to provide an interconnection that can effectively function in an electrochemical cell. Thus, although highly doped for electrical conductivity, the plasma deposited interconnection material suffers from not being substantially gas-tight, thereby allowing substantial amounts of gas to pass through its microstructure. For effectiveness, it is necessary to provide an interconnection material that is also substantially gas-tight, at least on a surface thereof. The gas-tightness of the highly doped interconnection layer can be enhanced by a post plasma spraying heat treating step to sufficiently close the pores or densify the layer. In order to effectively use a plasma sprayed interconnection deposit in an electrochemical cell, it preferably should have greater than 95% of theoretical density, more preferably greater than 99% of theoretical density, and be leak-tight to prevent intermixing of gases.

In the method of the invention, after plasma arc spraying, the deposit is then heated in air or a suitable atmosphere to densify the bulk lattice of the interconnection layer, by closing the pores and also by healing any macro-cracks and micro-cracks which may have formed during plasma spraying. The post spray heat treatment is preferably carried out at temperatures between about 1000° C. to 1400° C., more preferably 1100° C. to 1300° C., most preferably about 1200° C., and for about ½ to 1 hour. The preferred post spray heat treatment is at about 1200° C. for 1 hour. Temperatures greater than 1400° C. tend to result in $Cr_2O_3$ loss by volatilization and do not produce a dense coating. Temperatures lower than 1100° C. tend to be less effective. The heat treatment can be a separate operation or can be integrated with the continued processing of the electrochemical cell. In addition, the post plasma arc spray heat treatment provides a more uniform stoichiometric interconnection material composition. As a result of plasma spraying chromium compensated powder, the splat microstructure is characterized by alternating lamellae, e.g., La+Sr/Cr≦1.0. The heat treatment generally produces subsolidus reactions that tend to form a stoichiometric composition in isolated areas that may have either a chromium-rich phase or a lanthanum-rich phase. The final leak proof thermally sprayed and heated interconnection layer should be at least 95% of theoretical density, preferably at least 99% of theoretical density.

Additionally, if the electrolyte is applied after the interconnection, a solid electrolyte is applied over the remaining portion of the air electrode, and a cermet fuel electrode is applied over the electrolyte, to complete the formation of an electrochemical cell. An optional cermet coating over the interconnection layer can be applied. This arrangement is especially advantageous for a high temperature, solid oxide electrolyte fuel cell and is generally useful for various electrochemical cells and devices with similar aspects. The heat treatment step can also be integrated in with the continued processing of the electrochemical cell while the electrolyte is applied after the interconnection, with a cermet fuel electrode over the electrolyte, and a cermet coating over the interconnection. This will result in the formation of the high temperature, solid oxide electrolyte fuel cell and heat treatment of the interconnection layer.

According to the high temperature solid oxide electrolyte fuel cell application, each fuel cell is preferably tubular and is electrically connected at least in series to an adjacent fuel cell. The electrical connection is made along the axial length of the interconnection layer through a metal fiber felt as shown in FIG. 2. A typical cell generates an open circuit voltage of approximately one volt, and multiple cells can be connected in series and/or in parallel in order to provide the desired system voltage. The invention will now be illustrated with reference to the following Example.

EXAMPLE 1

A high temperature, solid oxide electrolyte fuel cell tube was prepared. Initially a porous support tube of calcia stabilized zirconia was generally surrounded by a porous fuel electrode of doped lanthanum manganite using standard techniques. The air electrode was masked except for a selected radial segment along the axial length of the tube onto which an interconnection layer of strontium doped lanthanum chromite particles compensated with 30% mol $Cr_2O_3$ was plasma arc sprayed onto the air electrode.

Prior to plasma arc spraying, the compensated strontium doped lanthanum chromite particles were agglomerated by spray drying techniques using a conventional spray dryer. The following spray drying parameters were used to form an agglomerated compensated powder of stoichiometric $La_{0.84}Sr_{0.16}CrO_3$ compensated with $Cr_2O_3$. The chromium compensated plasma spray feed powder selected was of the chemistry $La_{0.84}Sr_{0.16}CrO_3+zCr_2O_3$ where z was about 0.4. If desired, dopant may similarly compensated. It should be understood that the proportion of the basic composition $La_{1-x}M_xCr_{1-y}N_yO_3$ and compensated $zCr_2O_3$ constituent is derived from chemical analysis of deposits sprayed and can be varied depending on the analysis. The spray drying parameters were as follows:

| Slurry Parameters | |
|---|---|
| Powder (1.0–1.6 micron median particle size) | 58.0% |
| Water | 40.1% |
| 75-15 Polyvinyl Alcohol | 1.54% |
| Darvan 821A | 0.36% |
| Viscosity with #1 Brookfield Spindle | |
| Speed | Viscosity |
| 20 rpm | 35–50 centipoise |
| 50 rpm | 35–70 centipoise |
| 100 rpm | 75–100 centipoise |
| Drier (NIRO Drier) | |
| Inlet Temperature | 265° C.–285° C. |
| Outlet Temperature | 135° C.–140° C. |
| Liquid Feed Rate | 62.5 ml/min |
| Atomizer Wheel Speed | 30,000 rpm |

The chromium compensated strontium doped lanthanum chromite spray dried powder, i.e., $La_{0.84}Sr_{0.16}CrO_3+0.4Cr_2O_3$, made according to the above parameters were well agglomerated. In addition, the flowability of the agglomerated powder was improved after carbonizing the polyvinyl alcohol binder at 400°–420° C. for about 2 to 4 hours in $N_2$ after spray drying.

After agglomeration, the chromium compensated strontium doped lanthanum chromite powder was plasma arc sprayed over the selected portion of the air electrode. The plasma arc spraying parameters were as follows:

| | |
|---|---|
| Secondary gas (Hydrogen) | 0.368 slpm |
| Arc gas | 36.4 slpm |
| Powder carrier gas (Argon) | 3.1 slpm |
| Gun Power | 22 kilowatts |
| Powder Feed Rate | 13.5 g/min |
| Spray distance between spray gun and air electrode surface | 5.1 cm |
| Number of spray passes | 48 |
| Spray gun traverse velocity | 55 cm/second |
| Resulting deposit thickness | 80–100 microns |

Figure 4:
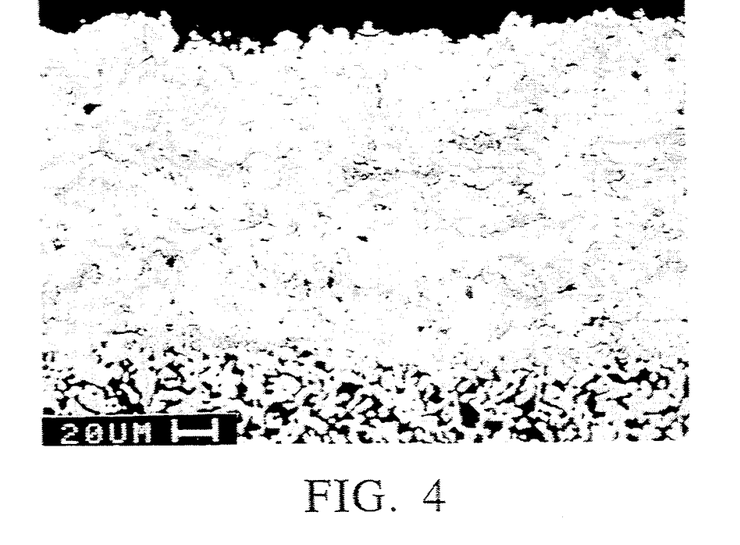
FIG. 4 is a scanning electron micrograph (SEM) of a plasma arc sprayed interconnection layer deposited onto a surface of a porous air electrode or cathode of an electrochemical cell formed by plasma spraying a chromium compensated doped lanthanum chromite spray dried agglomerated plasma spray feed powder according to the method of the invention.

Subsequent scanning electron micrographs (SEMS) of the chromium compensated powder plasma arc sprayed on a porous air electrode substrate according to the above parameters is shown in FIG. 4. FIG. 4 further shows porosity and micro-crack formation in the plasma arc sprayed interconnection layer.

Figure 5:
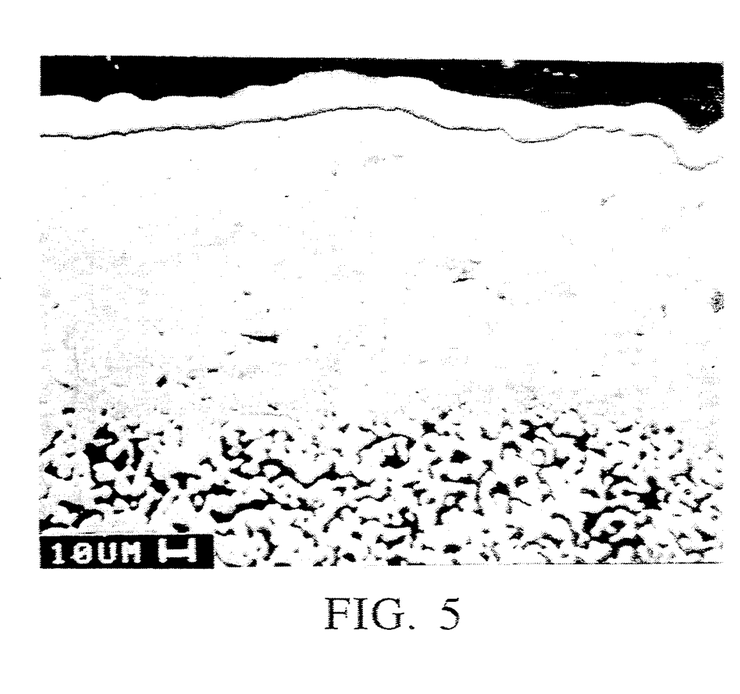
FIG. 5 is a SEM of the plasma arc sprayed interconnection layer of FIG. 4 after heat treatment during cell processing to densify and substantially close the pores of the plasma arc sprayed interconnection according to the method of the invention.

The air electrode-plasma sprayed interconnection composite was subsequently heat treated at about 1200° C. for between ½–1 hour as part of the remaining manufacturing steps of the cell formation. The heat treatment of chromium compensated doped lanthanum chromite plasma arc sprayed interconnection layer substantially closes the pores and heals the micro-cracks and macro-cracks to result in a dense, gas-tight, electrically conductive interconnection layer on an electrode surface of an electrochemical cell. FIG. 5 shows a scanning electron micrograph (SEM) of the plasma arc sprayed chromium compensated powder after heat treatment showing closing of pores and micro-cracks. Due to the intimate admixture of $La_{0.84}Sr_{0.16}CrO_3$ and $Cr_2O_3$, heat treatment produces subsolidus reactions that lowers the $La+Sr/Cr$ ratios of isolated areas that may have ratios higher than 1.0.

A solid oxide electrolyte of yttria stabilized zirconia was deposited on the remaining unselected portion of the air electrode by standard techniques. A fuel electrode of nickel-zirconia cermet was grown on the outer periphery of the electrolyte by standard techniques, and a top conductive layer was deposited on the interconnection to complete processing of the electrochemical cell.

Figure 6:
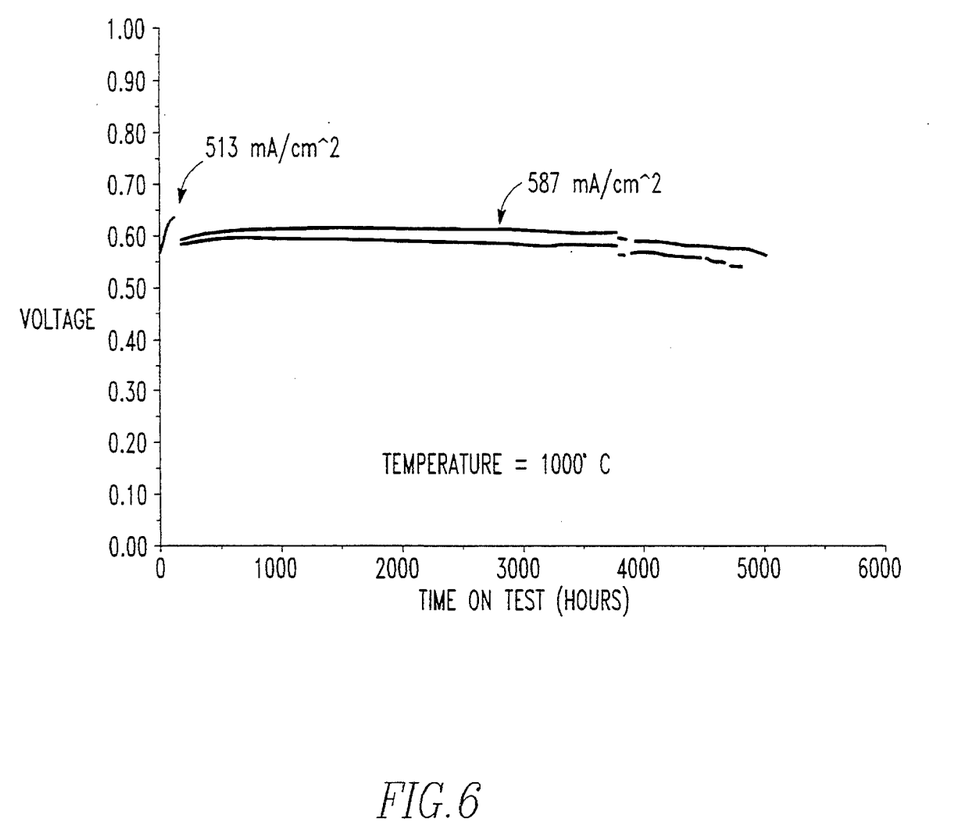
FIG. 6 is a graph of the electrical performance of two interconnected electrochemical cells, each cell having the interconnection material thereon formed by the method of the invention.

The electrochemical cell was then electrically connected to an adjacent electrochemical cell similarly made, and the electrical performance of the two interconnected cells having the plasma arc sprayed interconnection of the invention is shown in FIG. 6.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A method of forming dense, high temperature electrically conductive interconnection layer on an electrode structure, comprising the steps of:
   (a) providing a porous electrode structure;
   (b) forming by plasma spraying a compensated doped $LaCrO_3$ plasma spray feed powder, on a selected portion of the electrode surface, a layer of doped $LaCrO_3$ to form a porous interconnection material bonded to the electrode surface; and,
   (c) heating the interconnection material to about 1100° C. to 1300° C., to substantially close the pores of said porous plasma sprayed interconnection layer, to form a dense, substantially gas-tight, hydration-free, electrically conductive interconnection layer bonded to the electrode surface.

2. The method of claim 1, wherein the compensated doped $LaCrO_3$ plasma spray feed powder of step (b) is compensated with increased amounts of chromium as $Cr_2O_3$ to compensate for $Cr_2O_3$ loss during plasma spraying.

3. The method of claim 2, wherein the chromium compensated doped $LaCrO_3$ plasma spray feed powder comprises the general formula $La_{1-x}M_xCr_{1-y}N_yO_3+zCr_2O_3$, where M is a dopant selected from the group consisting of Ca, Sr and Ba or mixtures thereof, N is a dopant selected from the group consisting of Mg, Co, Ni and Al or mixtures thereof, x and y are each independently 0.075–0.25, and $0.2 \leq z \leq 0.5$.

4. The method of claim 3, wherein M is Sr, x is 0.075–0.25, y is 0, and z is 0.2–0.5.

5. The method of claim 4, wherein the chromium compensated doped $LaCrO_3$ plasma spray feed powder is $La_{0.84}Sr_{0.16}CrO_3+0.4Cr_2O_3$.

6. The method of claim 1, wherein the compensated doped $LaCrO_3$ plasma spray feed powder of step (b) is compensated with increased amounts of dopant to compensate for dopant loss during plasma spraying.

7. The method of claim 1, wherein the interconnection layer of step (c) is substantially stoichiometric and comprises the general formula $La_{1-x}M_xCr_{1-y}N_yO_3$, where M is a dopant selected from the group consisting of Ca, Sr, and Ba, N is a dopant selected from the group consisting of Mg, Co, Ni, and Al, and x and y are each independently about 0.075–0.25.

8. The method of claim 1, wherein the plasma spraying of step (a) is by plasma arc spraying.

9. The method of claim 1, wherein the compensated doped $LaCrO_3$ plasma spray feed powder of step (b) is agglomerated by spray drying prior to plasma spraying.

10. The method of claim 1, wherein the electrode structure is a porous, tubular air electrode structure comprising doped $LaMnO_3$.

11. The method of claim 10, wherein a gas-tight solid electrolyte comprising yttria stabilized zirconia is applied over the remaining unselected portion of the air electrode surface and a porous cermet fuel electrode comprising nickel-zirconia cermet is applied over the solid electrolyte, to form an electrochemical cell.

12. The method of claim 1, wherein the electrode structure is tubular.

13. The method of claim 1, wherein the electrode structure is planar.

14. A dense, substantially gas-tight, hydration-free, electrically conductive interconnection layer produced according to claim 1.

15. A high temperature, solid oxide electrolyte electrochemical cell capable of electronic interconnection to at least one other electrochemical cell, comprising:
   a first electrode;
   a solid electrolyte disposed on a first portion of the first electrode;
   a second electrode disposed on a portion of the solid electrolyte; and,
   an electrically conductive substantially gas-tight and substantially hydration-free interconnection material disposed on a second portion of the first electrode and capable of allowing electrical interconnection to at least one other electrochemical cell, said interconnection material comprising a plasma sprayed doped $LaCrO_3$ formed by plasma spraying a chromium compensated feed powder of the general formula $La_{1-x}M_xCr_{1-y}N_yO_3+zCr_2O_3$, where M is a dopant selected from the group consisting of Ca, Sr and Ba, N is a dopant selected from the group consisting of Mg, Co, Ni and Al, x and y are each independently 0.075–0.25, and $0.2 \leq z \leq 0.5$, and subsequently heat treated at about 1100° C. to 1300° C. to densify and form a substantially stoichiometric interconnection of the general formula $La_{1-x}M_xCr_{1-y}N_yO_3$.

16. The electrochemical cell of claim 15, wherein said interconnection is electrically connected to an interconnection of at least one other electrochemical cell.

17. The fuel cell of claim 15, wherein the first electrode is applied to a support comprised of calcia stabilized zirconia, the first electrode is an air electrode comprised of lanthanum manganite, the electrolyte is comprised of stabilized zirconia, and the second electrode is a fuel electrode comprised of nickel- or cobalt-zirconia cermet.

* * * * *